US011215909B2

(12) United States Patent
Hu et al.

(10) Patent No.: US 11,215,909 B2
(45) Date of Patent: Jan. 4, 2022

(54) LIGHT SOURCE SYSTEM AND PROJECTION DEVICE

(71) Applicant: APPOTRONICS CORPORATION LIMITED, Guangdong (CN)

(72) Inventors: Fei Hu, Guangdong (CN); Yuxuan Zhou, Guangdong (CN); Yi Li, Guangdong (CN)

(73) Assignee: APPOTRONICS CORPORATION LIMITED, Guangdong (CN)

( * ) Notice: Subject to any disclaimer, the term of this patent is extended or adjusted under 35 U.S.C. 154(b) by 123 days.

(21) Appl. No.: 16/469,428

(22) PCT Filed: Apr. 20, 2017

(86) PCT No.: PCT/CN2017/081306
§ 371 (c)(1),
(2) Date: Oct. 10, 2019

(87) PCT Pub. No.: WO2018/107634
PCT Pub. Date: Jun. 21, 2018

(65) Prior Publication Data
US 2020/0110329 A1    Apr. 9, 2020

(30) Foreign Application Priority Data
Dec. 15, 2016 (CN) .......................... 201611165283.0

(51) Int. Cl.
*G03B 21/20* (2006.01)
*G02B 26/00* (2006.01)

(52) U.S. Cl.
CPC ......... *G03B 21/204* (2013.01); *G02B 26/008* (2013.01)

(58) Field of Classification Search
CPC ............................ G03B 21/204; G02B 26/008
See application file for complete search history.

(56) References Cited

U.S. PATENT DOCUMENTS

| 2006/0139578 | A1 | 6/2006 | Nakagawa et al. |
| 2007/0052961 | A1 | 3/2007 | Lane et al. |
| 2014/0071407 | A1 | 3/2014 | Takahashi et al. |

FOREIGN PATENT DOCUMENTS

| CN | 101937162 | 1/2011 |
| CN | 202615106 | * 12/2012 |

(Continued)

OTHER PUBLICATIONS

International Search Report for International Application PCT/CN2017/081306, dated Aug. 28, 2017.
(Continued)

*Primary Examiner* — Sean P Gramling
(74) *Attorney, Agent, or Firm* — Burris Law, PLLC

(57) ABSTRACT

A light source system includes a first light source emitting first laser; a wavelength conversion device; a driver device driving the wavelength conversion device to move in such a manner that regions of the wavelength conversion device sequentially and periodically receive the first laser; a second light source emitting supplementary light consistent in color with light emitted by one primary color light region; a control device controlling on and off of the second light source, the control device controlling the second light source to be on in at least two of: every time period during which a primary color light region of a same color is receiving the first laser, every time period during which the mixed color light region is receiving the first laser, and some time periods during which a primary color light region of a different color is receiving the first laser.

20 Claims, 5 Drawing Sheets

(56) References Cited

FOREIGN PATENT DOCUMENTS

| | | |
|---|---|---|
| CN | 103809350 | 5/2014 |
| CN | 104412159 | 3/2015 |
| CN | 106154712 | 11/2016 |
| CN | 106154714 | 11/2016 |
| CN | 106200229 | 12/2016 |
| EP | 2271120 | 1/2011 |
| WO | 2016091106 | 6/2016 |

OTHER PUBLICATIONS

Supplementary European Search Report for European Application 17880855.6, dated Jul. 6, 2020.

* cited by examiner

LIGHT SOURCE SYSTEM AND PROJECTION DEVICE

CROSS-REFERENCE TO RELATED APPLICATIONS

This application is a continuation of International Application No. PCT/CN2017/081306, filed on Apr. 20, 2017, which claims priority to and the benefit of CNSN 201611165283.0 filed on Dec. 15, 2016. The disclosures of the above applications are incorporated herein by reference.

FIELD

The present disclosure relates to the field of light source technologies, and in particular, to a light source system and a projection device using the light source system.

BACKGROUND

The statements in this section merely provide background information related to the present disclosure and may not constitute prior art.

For the laser fluorescence white light source system used in a single digital light processing (DLP) projection system, its wavelength conversion device generally adopts a segment-type color wheel, including at least three colors of red (R), green (G) and blue (B). The projection system generally has requirement on the white field color of the white light source, so that the ratio of the three colors of R, G and B in the segment-type color wheel is relatively fixed.

Since the luminous efficiency of the red fluorescence in the laser fluorescence white light source system is relatively low, in addition to a main light source that emits light of three colors of RGB in the light source system, a supplementary light source of red light is usually provided, in order to increase the brightness of the red light. However, in present light source systems, if a supplementary light source is used, it is used in its corresponding color segment.

As in the related art CN201380035912.6, the main light source is RGB sequential light obtained by the blue light exciting fluorescent color wheel, and the supplementary light source is a red laser light source. The supplementary light source is not turned on until the color wheel rotates to the red segment, so that the red fluorescence and the red laser are superimposed to become the red light of the light source system. However, in such a system, the supplementary light source is only turned on when the red segment of the fluorescent color wheel is irradiated by an excitation light, which results in that the supplementary light source is in idle for most of time and thus its utilization rate is very low, thereby increasing the cost without providing a proper contribution to the brightness improvement of the light source system.

SUMMARY

The present disclosure provides a light source system aimed at obtaining a light source system having a high luminous flux and high supplementary light source utilization rate.

In one form, the present disclosure provides a light source system, including: a first light source configured to emit first laser; a wavelength conversion device located in an optical path of the first laser and configured to receive the first laser and emit second light, the wavelength conversion device at least including three primary color light regions and one mixed color light region; a driver device configured to drive the wavelength conversion device to move in such a manner that respective regions of the wavelength conversion device sequentially and periodically receive the first laser, the three primary color light regions receiving the first laser and emitting light of three primary colors and each of the primary color light regions emitting light of one primary color, and the mixed color light region receiving the first laser and emitting light of a mixed color; a second light source configured to emit supplementary light, the supplementary light being consistent in color with the light of one of the three primary colors; and a control device configured to control on and off of the second light source, the control device controlling the second light source to be on in at least two of: every time period during which a primary color light region of a same color is receiving the first laser, every time period during which the mixed color light region is receiving the first laser, and some time periods during which a primary color light region of a different color is receiving the first laser, the primary color light region of the same color being one of the three primary color light regions that emits light of a primary color same as that of the supplementary light, the primary color light region of the different color being one of the three primary color light regions that emits light of a primary color different from that of the supplementary light.

Optionally, the control device controls the second light source to be turned on at least in every time period during which the primary color light region of the same color is receiving the first laser and every time period during which the mixed color light region is receiving the first laser.

Optionally, the control device controls the second light source to be turned on at least in every time period during which the primary color light region of the same color is receiving the first laser and every time period during which the mixed color light region is receiving the first laser.

Optionally, a spectrum of the light of the mixed color and a spectrum of the supplementary light at least partially overlap.

Optionally, the supplementary light is of light of one of the three primary colors emitted by the wavelength conversion device having a lowest illuminous efficiency.

Optionally, the light source system further includes a color correction film located in an optical path of the second light and configured to move synchronously with the wavelength conversion device, the color correction film including a plurality of color segments each corresponding to one of the regions of the wavelength conversion device and configured to receive the second light and transmit at least a portion of the second light.

Optionally, when the control device controls the second light source to be turned on, one of the plurality of color segments of the color correction film that is located in the optical path of the second light allows the supplementary light to pass.

Optionally, the color correction film and the wavelength conversion device are respectively fixed at two opposite ends of the driver device, and move synchronously based on the driver device.

Optionally, the wavelength conversion device is a reflective color wheel, the color correction film is provided at a periphery of the color wheel, and the color correction film and the wavelength conversion device move synchronously based on the driver device.

Optionally, the color correction film and the wavelength conversion device are stacked and fixed to the driver device, and move synchronously based on the driver device.

Optionally, when the light source system is operating, the first light source is always on.

Optionally, the first light source is a blue laser light source, the second light source is a red light source, the mixed color light region of the wavelength conversion device is a yellow light region, and the primary color light regions of the wavelength conversion device include a red light region.

Optionally, the primary color light regions further include a blue light region and a green light region, and when an area of the blue light region, an area of the green light region, an area of the red light region and an area of the yellow light region are identical, the area of the blue light region and the area of the green light region are increased, and the area of the red light region or the area of the yellow light region is decreased.

Optionally, the primary color light regions further include a blue light region and a green light region; an area of the red light region and an area of the blue light region are identical, and a sum of the area of the red light region and the area of the blue light region is identical to a sum of an area of the green light region and an area of the yellow light region; and the area of the green light region is greater than the area of the yellow light region.

Optionally, the control device is configured to control the second light source to be on when the red light region and the yellow light region of the wavelength conversion device are receiving the first laser.

Optionally, the light source system further includes a light combining unit located in an optical path between the first light source and the wavelength conversion device and configured to receive the first laser and the supplementary light, combine the first laser and the supplementary light and emit the combined first laser and the supplementary light to the wavelength conversion device.

Optionally, the light source further includes a light combining unit located in an optical path of light emitted by the wavelength conversion device and configured to receive the second light and the supplementary light, combine the second light and the supplementary light and emit the combined second light and the supplementary light.

The present disclosure further provides a projection device, including a light source system, an optomechanical system and a display screen. The optomechanical system is located at a light exit of the light source system and configured to receive emitted light and project it onto the display screen. The light source system is the light source system described above.

In some variations of the present disclosure, a second light source is disposed in the light source system and used for emitting supplementary light. The supplementary light can increase the luminous flux of a certain primary color light, so that it is possible to appropriately reduce the size of the region occupied by the primary color light on the wavelength conversion device and increase the sizes of the regions for other primary colors, thereby improving the color of the emitted light and improving the brightness of the emitted light of the light source system. In such variations, the utilization rate of the second light source can be improved and the total luminous flux of the emitted light can be increased by turning on the second light source in at least two of the following three time period situations: every time period during which the primary color light region of a same color is receiving the first laser, every time period during which the mixed color light region is receiving the first laser, and some time periods during which a primary color light region of a different color is receiving the first laser.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

DESCRIPTION OF THE REFERENCE NUMERALS

TABLE 1

Figure 1:
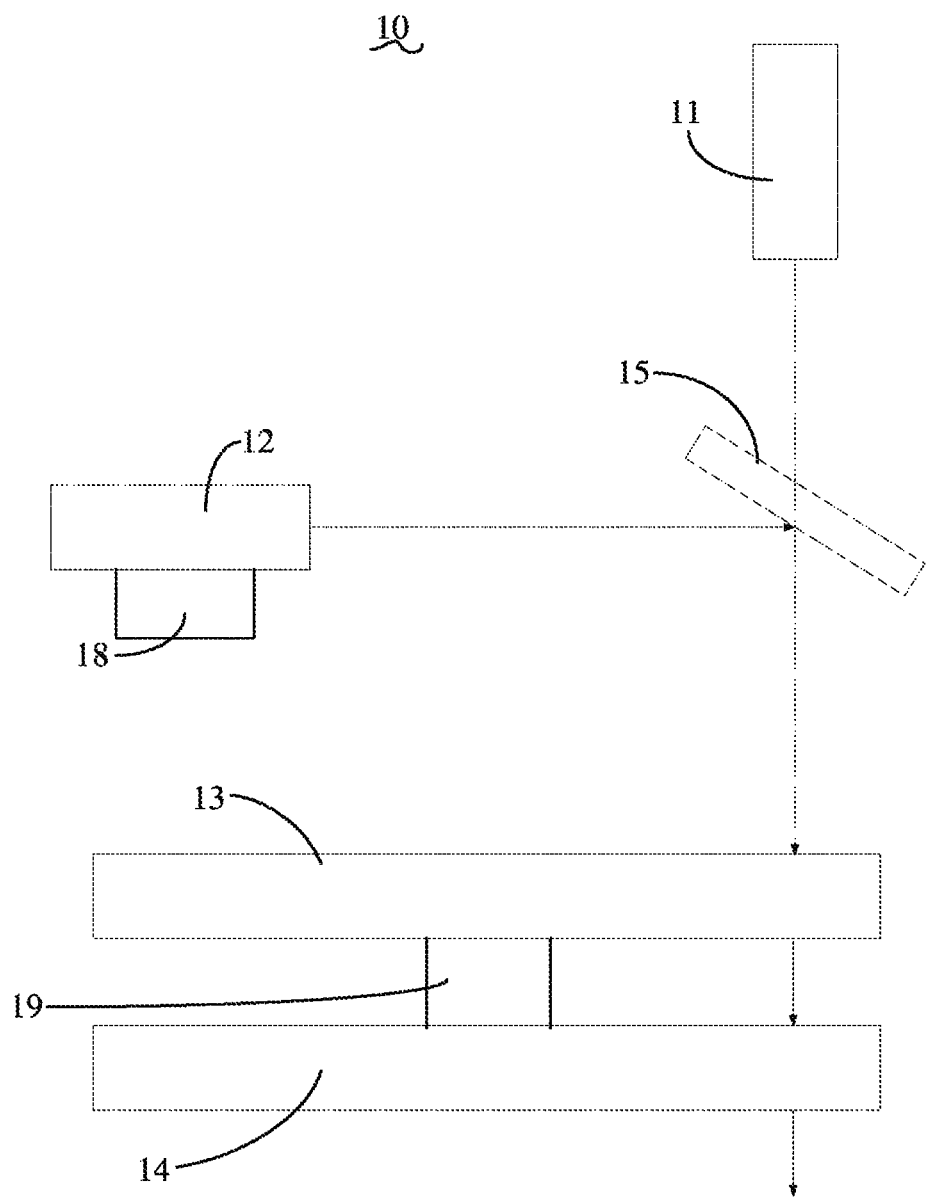
FIG. 1 is a structural schematic diagram of a first form of a light source system according to the present disclosure.

| Reference Numeral | Name |
| --- | --- |
| 10 | Light source system |
| 11 | First light source |
| 12 | Second light source |
| 13 | Wavelength conversion device |
| 131 | Sector region |
| 14 | Color correction film |
| 15 | Light combining unit |
| 16 | Light combining unit |
| 17 | Light homogenizing assembly |
| 18 | Control device |
| 19 | Driver device |

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The maximum brightness of the light source system is determined by the brightness of the white light emitted therefrom. In order to obtain standard white light, light of the three primary colors (such as, but not limited to, red light, blue light, and green light) that make up the white light need to be mixed at a certain ratio. Assuming that a relative brightness of light of a primary color is a ratio of a brightness of the light of the primary color to a percentage of the primary color light in the standard white light, when the relative brightness of light of the respective primary color emitted by the light source system is different, the brightness of the white light of the light source system depends on light of the primary color having the lowest relative brightness. At this time, the white light can be obtained by increasing the brightness of the light of the primary color or reducing the brightness of light of the other two primary colors. The concept of the white light herein is applicable to the white light directly obtained after mixing light of the three primary colors, and to the white light obtained by the three primary colors relying on vision persistence effect of human eyes sequentially.

The related art, by adding a light source corresponding to light of a primary color as a supplementary light source and combining it with a main light source emitting sequential light by laser exciting a fluorescent color wheel, increases the luminous flux of light of the primary color, thereby increasing the overall brightness of the light source system. However, the time during which the supplementary light source is turned on is too short, so that this light source cannot be effectively used, making the brightness improvement of the light source system limited.

In present disclosure the time period during which the supplementary light source is turned on is not limited to the time period during which the light of the primary color corresponding to the supplementary light source emits light, but the supplementary light source is on in more time periods to obtain enhanced utilization of this supplementary light source, thereby greatly increasing the brightness of the light source system. It should be understood that this process introduces another mixed color other than the three primary colors (this mixed color is composed of the supplementary light and light having another color that is different from the color of the supplementary light and emitted by the main light source). The mixed color is involved in the calculation of synthesizing white light, and the ratio of each color in the standard white light is calculated, thereby adjusting the time ratio occupied by each sequential light of the main light source (the light source that emits the sequential light by the laser irradiating a wavelength conversion device that is moving), reducing the time ratio occupied by the low-efficiency color light in the main light source and increasing the time ratio occupied by the high-efficiency color light in the main light source.

In more detail, an additional time period during which the supplementary light source is on is added without changing the light modulation rule and the structure of the light source system, and the color coordinates of the white light emitted by the light source system are shifted towards the direction of the color of the supplementary light. In order to cause the color coordinates of the white light to return to the color coordinates of the standard white light, it is desired to increase a component ratio of an opposite-color light of the supplementary light of the light source system by changing the time period of each color light of the light source system. Since the time of each cycle is fixed, the time period of the color light corresponding to the supplementary light needs to be reduced while increasing the time period of the opposite-color light of the supplementary light, but this does not mean that the on time of the supplementary light source is shortened compared to the related art. The reason for this is that the time period of the opposite-color light of the supplementary light should be longer than the time period of this opposite-color light. Namely, the intensity of this opposite-color light of the light source system will be increased, and the intensity of the white light of the light source system will also be increased. Due to the increasing of the total output intensity of the light source system, and the intensity and the on time of the excitation light source are unchanged and the output intensity of the supplementary light source is unchanged, it means that the on time of the supplementary light source is increased, which increases the utilization rate of the supplementary light source.

Teachings of the present disclosure are clearly and completely described with reference to the accompanying drawings. It is apparent that the described forms are only part of the teachings of the disclosure. All other forms obtained by those skilled in the art based on the forms of the present disclosure without creative efforts are within the scope of the present disclosure.

In addition, the descriptions of "first", "second", and the like in the present disclosure are used for the purpose of description only and are not to be construed as indicating or implying their relative importance or implicitly indicating the number of technical features indicated. Thus, features defining "first", "second" may include at least one of the features, either explicitly or implicitly. In the description of the present disclosure, the meaning of "multiple" is at least two, such as two, three, etc., unless specifically defined otherwise.

In addition, the teachings of the various forms of the present disclosure may be combined with each other based on what can be implemented by those skilled in the art. When the combination of teachings is contradictory or unrealizable, it should be considered that the combination of such teachings does not exist and is not within the scope claimed by the present disclosure.

The present disclosure provides a light source system 10.

Referring to FIG. 1, in one form of the present disclosure, the light source system 10 includes: a first light source 11 for emitting first laser; a wavelength conversion device 13 located in an optical path of the first laser and used for receiving the first laser and emitting second light, the wavelength conversion device 13 including multiple regions (not labeled) including three primary color light regions and one mixed color light region, the three primary color light regions receiving the first laser and emitting light of three primary colors and each of the primary color light regions emitting light of one primary color, the mixed color light region receiving the first laser and emitting a mixed color light; a driver device 19 for driving the wavelength conversion device 13 to move in such a manner that respective regions of the wavelength conversion device 13 sequentially and periodically receive the first laser; a second light source 12 for emitting supplementary light. The supplementary light is light of a primary color and consistent in color with light of one of the three primary colors emitted by the wavelength conversion device 13. The supplementary light is incident on the wavelength conversion device 13 after being combined with the first laser, and finally emitted together with the second light emitted by the wavelength conversion device 13.

The light source system 10 further includes a control device 18 for controlling on and off of the second light source 12. It is known that the multiple regions of the wavelength conversion device 13 at least include: a primary color light region of a same color (the primary color light region of a same color being a primary color light region that emits light of a primary color same as that of the supplementary light in the three primary color light regions), a mixed color light region and a primary color light region of a different color (the primary color light region of a different color being a primary color light region that emits light of a primary color different from that of the supplementary light in the three primary color light regions). The control device 18 controls the second light source 12 to be turned on in at least two of the following three time period situations: every time period during which the primary color light region of a same color is receiving the first laser, every time period during which the mixed color light region is receiving the first laser, and some time periods during which the primary color light region of a different color is receiving the first laser.

The first light source 11 is a blue laser light source, and the first laser emitted therefrom is blue laser. A laser light source has the advantages of a high energy density and a narrow spectrum and is suitable for the projection display field of a high-brightness and high-color display range. In at least one form of the present disclosure, the first light source 11 may also be a blue-violet laser light source or an ultraviolet laser light source. It can also be other non-laser solid state light sources, such as LED light sources, especially high-brightness LED light sources. The first light source 11 can be either a laser-device light source or a laser diode source or a laser diode array source.

The first laser emitted from the first light source 11 is incident on the wavelength conversion device 13, and the wavelength conversion device 13 moves relative to the first laser under the driving of the driver device 19, in such a manner that respective regions on the wavelength conversion device 13 are sequentially and periodically placed in the optical path of the first laser. The wavelength conversion device 13 includes a transparent substrate having a surface coated with a fluorescent material. The transparent substrate may be made of a material such as optical glass, sapphire, transparent ceramic or the like, and the fluorescent material coated on the surface may include a material such as phosphor, a quantum dot or the like. The fluorescent material can form a fluorescent layer through a bonding material, and the bonding material can be an organic material such as silica gel, epoxy resin or the like, or an inorganic material such as glass, ceramic or the like. Further, in at least one form of the present disclosure, the fluorescent material of the wavelength conversion device 13 is packaged in the transparent substrate instead of being layered with respect to the transparent substrate.

Figure 2:
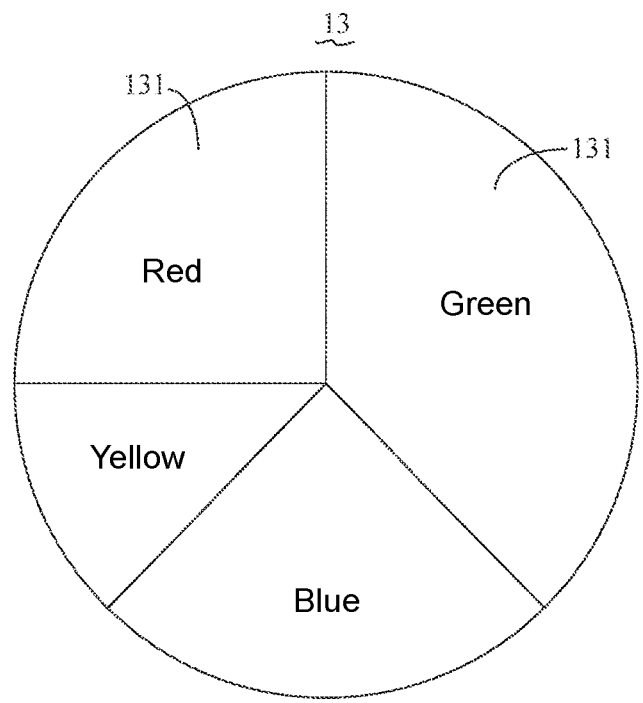
FIG. 2 is a schematic diagram of a form of a wavelength conversion device in the light source system shown in FIG. 1.

Referring to FIG. 2, FIG. 2 is a schematic diagram of the wavelength conversion device 13 in the light source system shown in FIG. 1, and the wavelength conversion device 13 has a disk shape and includes four sector regions 131 of red, green, blue and yellow. In the display field, red (R), green (G), and blue (B) are usually used as the three primary colors (but not limited to) to express various colors. In order to increase brightness, yellow is further added on basis of the three primary colors, so that the brightness of white (namely, the brightest color that the display device can display) is further improved. In at least one variation, four regions of red, green, blue and yellow are used, corresponding to three primary colors of red, green and blue and one mixed color of yellow. The red light region, the green light region and the yellow light region (i.e., the mixed color light region) respectively include a red light fluorescent material, a green light fluorescent material and a yellow light fluorescent material, and respectively convert the first laser of blue light, after receiving it, into excited light of red, green and yellow. The blue light region of the wavelength conversion device 13 is a transmissive region for transmitting the first laser of blue light directly as the displayed color light. In one variation, the transmissive region contains a scattering material for changing the light distribution of the blue laser to inhibit the blue laser from showing interference light spot on the screen.

It can be understood that both the excited light emitted by the wavelength conversion device 13 upon receiving the first laser and the first laser transmitted through the wavelength conversion device 13 belong to second light, and at this time, the second light is sequential light of the excited light and the transmitted first laser.

In at least one variation, each region of the wavelength conversion device 13 has a sector shape. In another variation of the present disclosure, the wavelength conversion device 13 also has a disk shape, but the respective color regions thereon are of a sector-ring shape and are collectively spliced into a circular ring shape.

In some variations, the wavelength conversion device 13 is a color wheel that rotates about its center axis under the driving of the driver device 19 (such as a motor). In other variations of the present disclosure, the wavelength conversion device 13 may also be a color barrel/color cylinder including multiple regions distributed around the barrel/cylinder surface, and the color barrel/color cylinder rotates about its axis direction, so that the multiple regions are sequentially and periodically irradiated by the excitation light source. In still other variations of the present disclosure, the wavelength conversion device 13 may also be a color plate including multiple regions arranged in sequence in a straight line direction, and the color plate linearly vibrates in the straight line direction, such that the multiple regions are sequentially and periodically irradiated by the excitation light source.

In at least one variation, the second light source 12 is a red light source, and emits red light as supplementary light for improving the red display effect of the light source system 10. The red light is selected as a supplementary light source since the luminous efficiency of the red fluorescent material is relatively low so that red has an effect inferior to that of other colors. With the advancement of material science, in other variations, light sources of other primary colors may also be selected as the supplementary light of the second light source. The second light source may be a laser light source or an LED light source.

In some variations, the light source system includes a light combining unit 15 located in an optical path between the first light source 11 and the wavelength conversion device 13. The supplementary light emitted by the second light source 12 and the first laser emitted by the first light source 11 are combined by the light combining unit 15 before being incident on the wavelength conversion device 13, and the combined light is incident on the wavelength conversion device 13. Since the supplementary light is red light, the light will not be absorbed and converted by the respective regions of the wavelength conversion device 13 and no excitation effect is generated, but instead, it passes through the wavelength conversion device 13 and is emitted together with the second light (if the supplementary light is light of other color, it is preferable that the supplementary light does not generate an excitation effect in the wavelength conversion region). In at least one variation, the light combining unit 15 is a dichroic color film (specifically, a wavelength filter) and has a region for transmitting the first laser and reflecting the supplementary light. It should be understood that the dichroic color film can also transmit the supplementary light and reflect the first laser, as long as positions of the first light source 11 and the second light source 12 are exchanged. By combining the supplementary light with the first laser before the light beam is incident on the wavelength conversion device, the light distributions of respective light components of the finally emitted light can be made closer, so that the color uniformity of the emitted light is better.

The light combining unit 15 takes advantages of the difference in wavelengths between the first laser and the supplementary light to perform the combining. In some variations, the difference in polarization states between the two kinds of light can be used for performing combining, and the difference in spatial positions or difference in light beam cross-sectional regions between the two light beams can be used for performing geometrical combining. In one variation of the present disclosure, the light combining unit 15 may be absent, and the supplementary light and the first laser are incident on the wavelength conversion device 13 from different angles, respectively.

The control device 18 controls on or off of the second light source 12. When the red light region of the wavelength conversion device 13 emits red light upon receiving the irradiation of the first laser and when the yellow light region of the wavelength conversion device 13 emits yellow light upon receiving the irradiation of the first laser, the control device 18 controls the second light source 12 to be on such that the supplementary light of red is respectively emitted together with the red light and the yellow light of the wavelength conversion device 13, to form the emitted light of the light source system 10. At this time, the yellow light emitted from the wavelength conversion device 13 and the red light emitted from the second light source 12 constitute orange light, and it is equivalent to that the light source system 10 emits sequential light of four colors of red, green, blue and orange. Thus, the utilization rate of the second light source 12 is greatly improved with respect to the related art, and the luminous flux of the emitted light of the light source system 10 is greatly increased.

In principle, in order to obtain white light of standard color coordinates, the respective colors in the sequential light emitted by the light source system 10 need to have a certain ratio. When the color segment regions of the wavelength conversion device 13 remain unchanged, the emitted light changes from four colors of red, green, blue, yellow to four colors of red, green, blue and orange, and the white light changes from the standard color coordinates to reddish; and in order to change the white light back to the standard white, it is desired to reduce the amount of red and increase the amounts of blue and green. Most intuitively, it is desired to increase sizes of blue and green regions on the wavelength conversion device 13, and to reduce a size of the red or yellow region. Since the luminous efficiencies of the blue light and the green light are much larger than that of the red light, and the green light has the greatest influence on the brightness of the white light, the brightness of the emitted light from the light source system 10 can be greatly improved with this technical solution.

For example, if the wavelength conversion device is equally divided into four regions of red, green, blue and yellow, the second light source is also turned on in the yellow region for supplementing light, and in order to obtain the standard white light, the wavelength conversion device 13 will be replaced with the wavelength conversion device as shown in FIG. 2. Area relationships between the primary color light region (the red, green and blue regions) and the mixed color light region (the yellow region) on the wavelength conversion device 13 can be as follows (this region relationship is only for the sake of discussion convenience, but not the actual region relationship): an area of the red light region and an area of the blue light region are identical, and a sum of the areas of the two is equal to a sum of the area of the green light region and an area of the yellow light region, and the area of the green light region is larger than that of the yellow light region.

Figure 4:
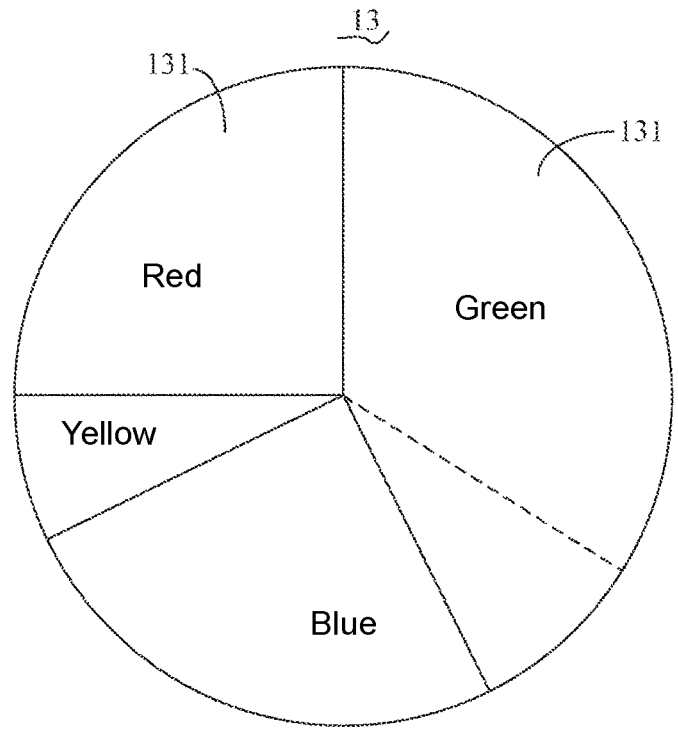
FIG. 4 is a schematic diagram of another form of a wavelength conversion device in the light source system shown in FIG. 1.

In another form of the present disclosure, in addition to being on when the red light region and the yellow light region are receiving the irradiation of the first laser, the second light source 12 is also on when a partial region of the green light region is receiving the irradiation of the first laser. Referring to FIG. 4, four colors of red, green, blue and yellow of the main light source are replaced with five colors of red, green, blue, orange and yellow of the light source system 10. The orange color is synthesized by the yellow light of the main light source and the red light of the second light source, and the yellow color is synthesized by the green light of the main light source and the red light of the second light source. The light source system of the above form further causes the white light color coordinates to shift towards red, which further requires increasing the green region to obtain white balance, thereby further improving the brightness of the emitted light from the light source system 10. It should be noted that the second light source cannot be on in all the green regions to supplement light, and the reason is that there is the reduced requirement for a ratio of the luminous flux of the monochromatic green light to the emitted light, and otherwise the light source system cannot present the monochromatic green color. Similarly, in any other technical solution, the supplementary light source cannot be continuously on in the primary color light region of the non-supplementary light color, otherwise the monochrome of the primary color light cannot be presented.

In another form of the present disclosure, in addition to being on when the red light region and the yellow light region are receiving the irradiation of the first laser, the second light source 12 is also on when a partial region of the green light region and a partial region of the blue light region are receiving the irradiation of the first laser. This technical solution can also increase the utilization rate of the second light source 12 and increase the luminous flux of the light source system 10.

In other forms of the present disclosure, the second light source 12 may also be on only when the yellow light region is receiving the irradiation of the first laser and a part of the green light region is receiving the irradiation of the first laser, or the second light source is on when the yellow light region is receiving the irradiation of the first laser and a part of the blue light region is receiving the irradiation of the first laser, or the second light source 12 is on when the red light region is receiving the irradiation of the first laser and a part of the green light region is receiving the irradiation of the first laser.

In one form, as shown in FIG. 1, the light source system 10 further includes a color correction film 14 located in the optical path of the second light emitted by the wavelength conversion device 13. In this form, the color correction film 14 moves in synchronization with the wavelength conversion device 13 and includes multiple color segments, and each of the multiple color segments corresponds to one of the multiple regions of the wavelength conversion device 13 for receiving the second light and transmitting at least a portion of the second light.

The color correction film 14 can modify the spectral peak of the received second light so that the color coordinates of the emitted second light meet the light emission requirement. Moreover, the color correction film 14 can also selectively transmit the received second light and first laser. For example, when the wavelength conversion device 13 emits red light, the red light in a preset wavelength range can be transmitted, and the color correction film 14 allows only the red light in this wavelength range to be transmitted, and the red light in other wavelength ranges is not allowed to be transmitted. The color correction film 14 may be located on the same driver device 19 as the wavelength conversion device 13, or a separate driving member may be used, but it is desired to achieve that the rotation of the color correction film 14 is synchronized with the wavelength conversion device 13. In the present form, the color correction film 14 and the wavelength conversion device 13 are located on the same driver device 19 and are respectively fixed and connected at two opposite ends of the driver device 19.

Figure 3:
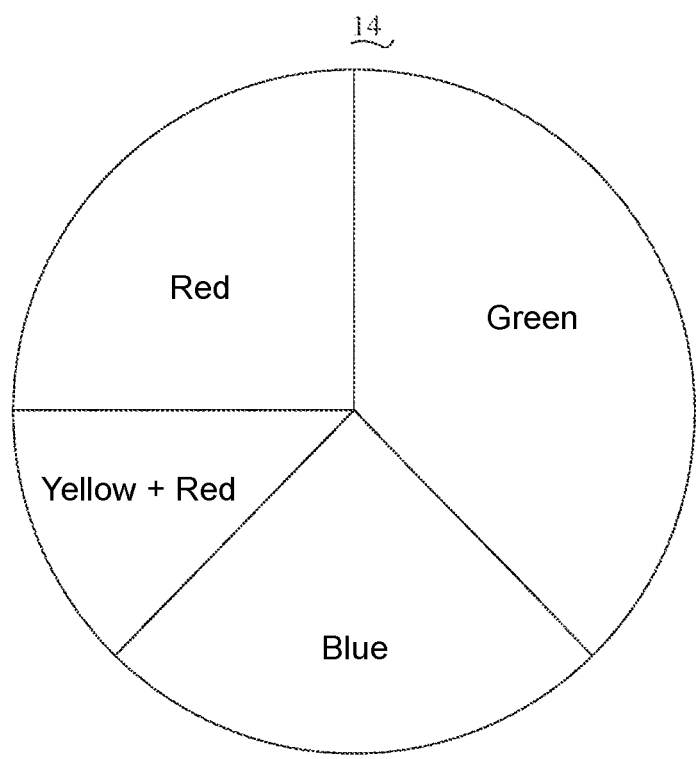
FIG. 3 is a schematic diagram of a form of a color correction film in the light source system shown in FIG. 1.

As shown in FIG. 3, FIG. 3 is a schematic diagram of a color correction film in the light source system shown in FIG. 1. The multiple color segments of the color correction film 14 may be disposed in one-to-one correspondence with the respective regions of the wavelength conversion device 13, i.e., also including a red light color segment, a blue light color segment, a green light color segment and a yellow light color segment. Moreover, the color segments on the color correction film 14 are arranged in such a manner that when the second light source 12 is on, the color segments of the color correction film 14 in the optical path are still capable of transmitting the supplementary light of red. As shown, the yellow light color segment transmits both the yellow light and the red light.

Figure 5:
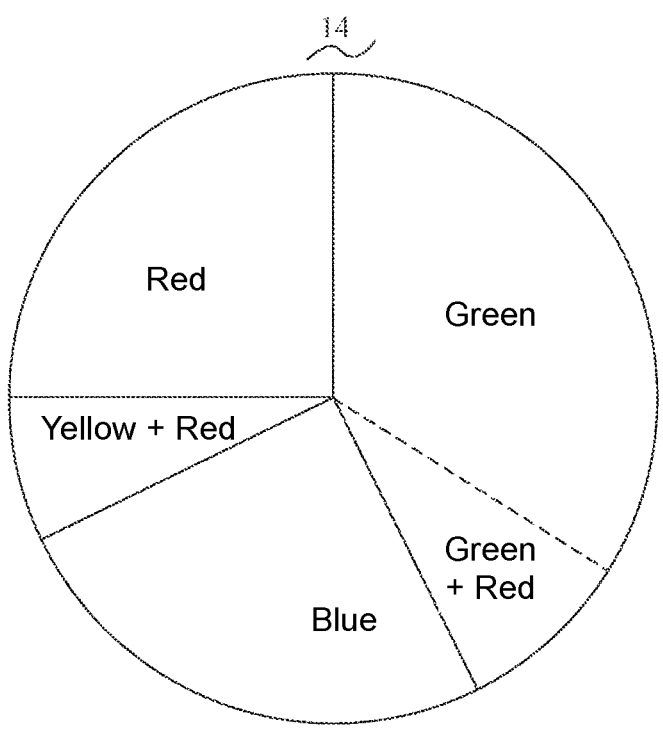
FIG. 5 is a schematic diagram of another form of a color correction film in the light source system shown in FIG. 1.

As shown in FIG. 5, FIG. 5 is a schematic diagram of a color correction film in the form corresponding to FIG. 4. Since the second light source 12 is on in the yellow light region, the red light region and a part of green light region, the color segments of the color correction film 14 corresponding to these regions transmit the supplementary light of the red light, in addition to transmitting the yellow light, the red light and the green light.

In one form of the present disclosure, the first laser emitted from the first light source 11 is irradiated onto the wavelength conversion device 13 that is driven to move by the driver device, forming the sequential light. The wavelength conversion device 13 includes at least three primary color light regions and one mixed color light region, and the sequential light includes at least light of three primary colors and light of one mixed color. The second light source 12 emits supplementary light that is of the same color as that of light of one primary color emitted by the wavelength conversion device 13, and the illuminous efficiency of the light of the primary color is the lowest in the emitted light of the wavelength conversion device 13. The spectrum of the light of the mixed color at least partially overlaps the spectrum of the light of the primary color, and the second light source 12 is turned on to emit supplementary light at least in every time period during which the primary color light region of the same color (the primary color light region having the same color as the supplementary light) is receiving the first laser and every time period during which the mixed color light region is receiving the first laser, such that the supplementary light and the light emitted from the wavelength conversion device 13 are combined and emitted. Accordingly, the "short board" in the emitted light of the wavelength conversion device 13 is supplemented by using a separate supplementary light source, thereby increasing the light emission efficiency and the total luminous flux of the light source system 10. Moreover, since the spectrum of the light of the mixed color and the spectrum of the light of the primary color having the same color as that of the supplementary light at least partially overlap, the color coordinates are inhibited from excessively changing after combining of the mixed color light and the supplementary light, which makes it more convenient to set the size of each region of the wavelength conversion device 13. In addition, since the spectrum of the mixed color light and the spectrum of the primary color light having the same color as that of the supplementary light at least partially overlap, it means that the spectrum of the light of the mixed color at least partially overlaps the spectrum of the supplementary light, making the display effect of the combined light color of the two better. The supplementary light source being on in the primary color light region of a same color and the mixed color light region can utilize the time periods of these two regions to the utmost without worrying about the lack of color in the light emitted by the light source system 10 or the insufficient brightness of a certain color. If the second light source 12 is on in the primary color light region of a different color, the time during which the second light source 12 is on cannot be too long in order to achieve that sufficient monochromatic primary color light is emitted, so that the effect on improving the utilization rate of the supplementary light source is limited. In at least one variation of the above-mentioned FIG. 1, the supplementary light is red light and the light of the mixed color is the emitted light of the yellow light region of the wavelength conversion device 13.

In at least one form of the present disclosure, when the light source system 10 is in an operating state, the first light source 11 is continuously on to increase the utilization rate of the first light source 11.

In particular, when the red light region and the yellow light region of the wavelength conversion device 13 are receiving the first laser, the control device 18 controls the second light source 12 to be on. Compared with other forms, this form not only can improve the utilization rate of the second light source 12 but can also further increase the luminous flux of the white light finally obtained.

In one form of the disclosure, the first light source 11 is an ultraviolet light source. At this time, the blue light region of the wavelength conversion device 13 is a blue fluorescent region, which absorbs ultraviolet light and emits blue light.

Figure 6:
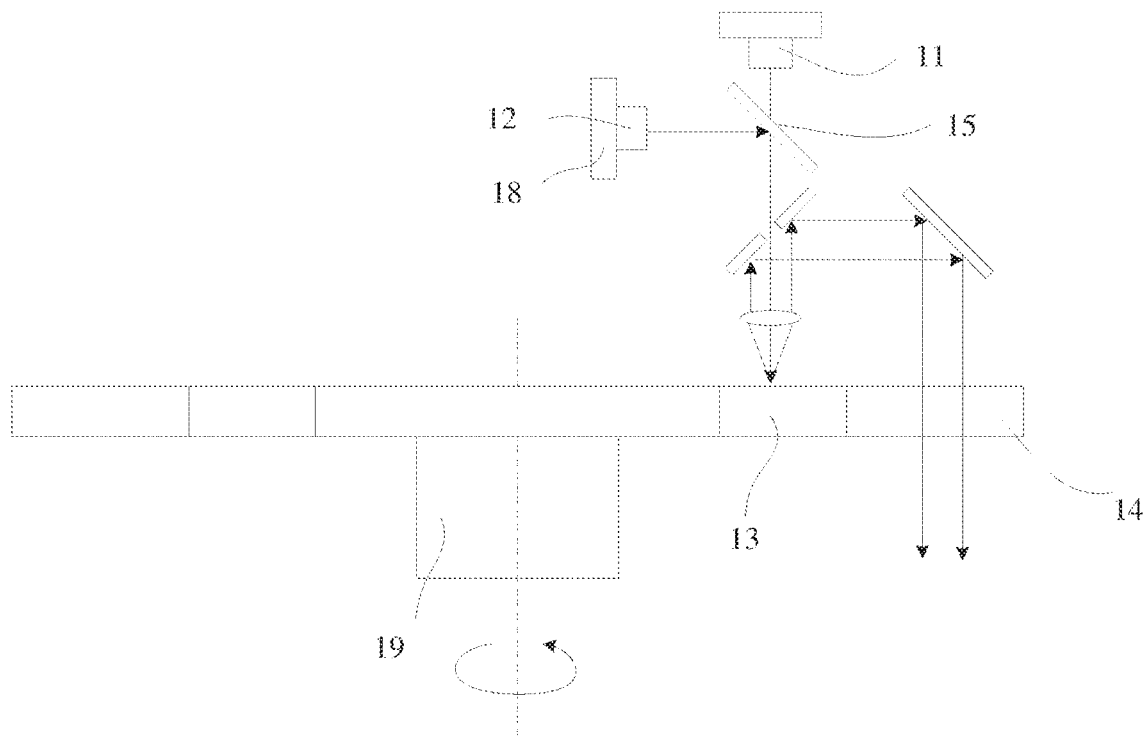
FIG. 6 is a structural schematic diagram of a second form of a light source system according to the present disclosure.

Referring to FIG. 6, FIG. 6 is a structural schematic diagram of a second form of a light source system of the present disclosure. Unlike the first form, in the second form of the present disclosure, the wavelength conversion device 13 of this light source system 10 is a reflective color wheel, and the color correction film 14 and the wavelength conversion device 13 are disposed on one integrated component and driven by the same driver device 19. The color correction film 14 is fixed and connected to the periphery of the color wheel, and this structure can simplify the structure of the color wheel and the color correction film, thereby saving material and reducing the cost, and moreover, it is beneficial to heat dissipation and the service life is improved. The color wheel reflects the supplementary light and the second light, and by providing multiple sets of reflective lenses, the supplementary light and the second light are combined and emitted towards the color correction film 14. In this structure, the second light source 12 can be on when at least two regions of the red light region, the yellow light region and a partial region of the green light region are receiving the first laser, so as to increase the finally emitted light flux. In the present form, when the first light source 11 is blue laser, the multiple regions, including a reflective region, of the wavelength conversion device 13 reflect the first laser, thereby directly obtaining the emitted light of blue light. Further, the reflective region is a diffuse reflection region for changing the light distribution of the blue laser to make it more uniform.

Figure 7:
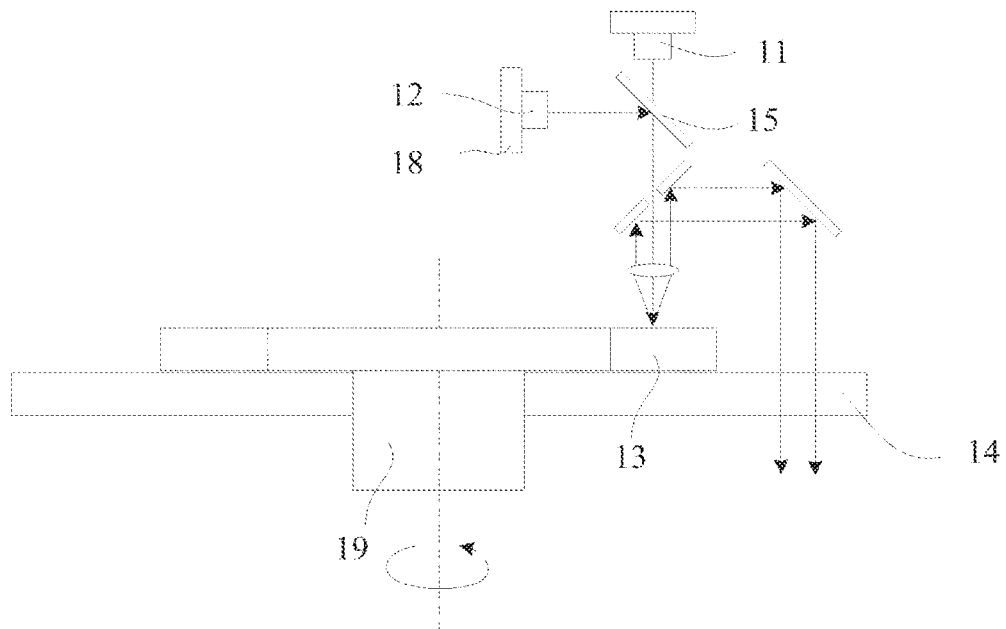
FIG. 7 is a structural schematic diagram of a third form of a light source system according to the present disclosure.

Referring to FIG. 7, in the third form of the present disclosure, the fixing and connecting manner of the wavelength conversion device 13 and the color correction film 14 in the light source system 10 is different from that in the above form. In the present form, the color correction film 14 and the wavelength conversion device 13 are two independent components, which are stacked and driven by the same driver device 19. The color correction film 14 is fixed and connected to the driver device 19 adjacent to the color wheel. The configuration of this structure can make it easy to install and remove the color correction film 14, and as for the design of the optical path, the wavelength conversion device 13 can also be designed in various modes and has strong adaptability.

Figure 8:
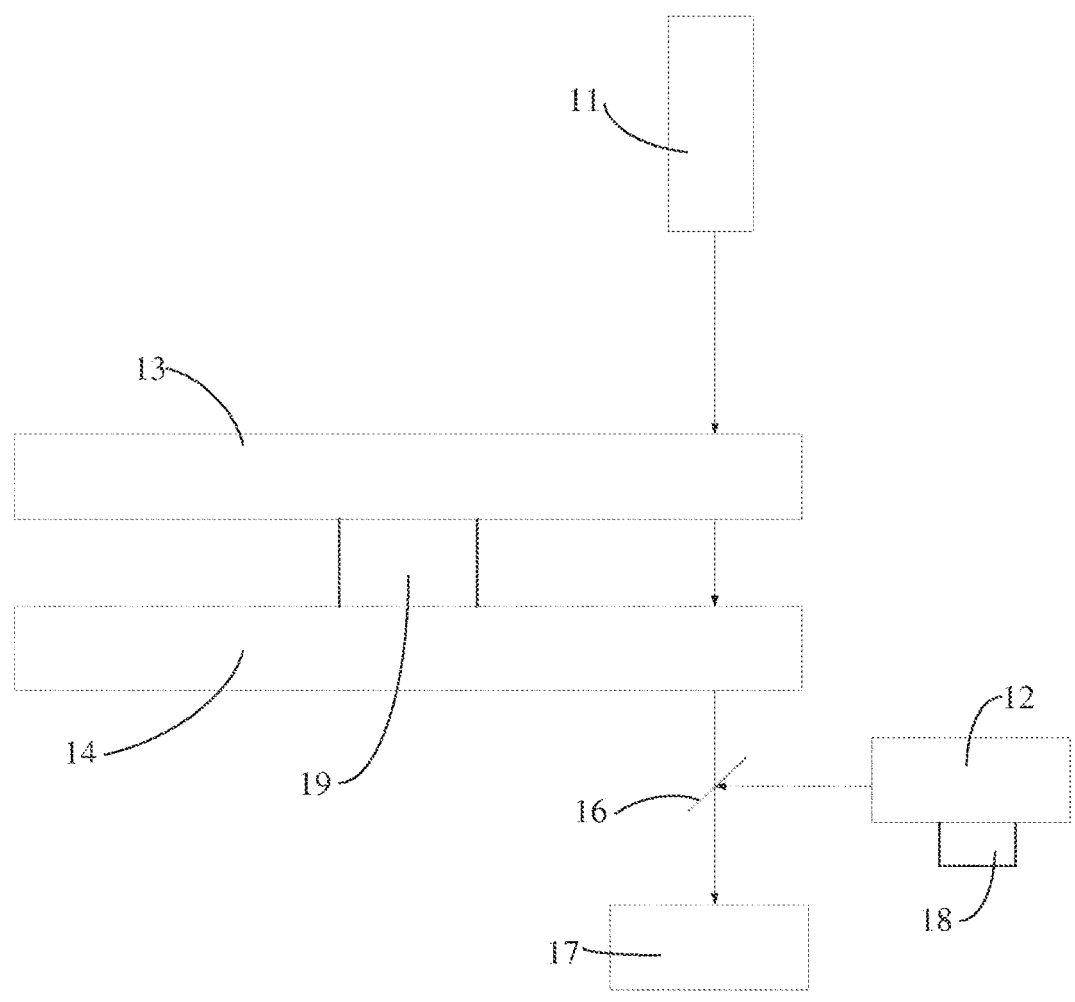
FIG. 8 is a structural schematic diagram of a fourth form of a light source system according to the present disclosure.

Referring to FIG. 8, unlike the first form, in the fourth form of the present disclosure, the light combining unit 16 of the light source system in the present form is located in the optical path of the second light emitted from the wavelength conversion device 13, receives the second light and the supplementary light and emits the two after combining them. At this time, the second light source 12 is located on a side of the wavelength conversion device 13 facing away from the first light source 11.

In the present form, the second light source 12 is located on the side of the wavelength conversion device 13 facing away from the first light source 11. Namely, the supplementary light is directly combined with the second light and emitted without passing through the wavelength conversion device 13 and the color correction film 14, so that there is no light loss of the supplementary light on the wavelength conversion device 13. The light combining unit 16 may be a reflective lens, and the reflective lens has a region that can transmit the second light and reflect the supplementary light or has a region that can reflect the second light and transmit the supplementary light. The combining of the second light and the supplementary light is geometrical combining, and the structure is relatively simple, and the cost is low, which will cause a small portion of the second light to be lost but does not affect the overall light emission efficiency. The configuration of the structure can also be provided with a light homogenizing assembly 17 at the light exit, so that the emission of the white light after combining is more uniform, thereby resulting in good brightness.

In another form the present disclosure provides a projection device (not shown) including a light source system, an optomechanical system (not shown), and a display screen (not shown). The light machine system is located at a light exit of the light source system, receives the emitted light and projects it onto the display screen. The light source system is the above light source system. Since the light source system of the projection device adopts all the teachings of all the above forms, it at least has all the beneficial effects brought by the teachings of the above forms, which will not be repeatedly described herein.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice; material, manufacturing, and assembly tolerances; and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A light source system, comprising:
a first light source configured to emit first laser;
a wavelength conversion device located in an optical path of the first laser and configured to receive the first laser and emit second light, the wavelength conversion device at least comprising three primary color light regions and one mixed color light region;
a driver device configured to drive the wavelength conversion device to move in such a manner that respective regions of the wavelength conversion device sequentially and periodically receive the first laser, the three primary color light regions receiving the first laser and emitting light of three primary colors and each of the primary color light regions emitting light of one primary color, and the mixed color light region receiving the first laser and emitting light of a mixed color;
a second light source configured to emit supplementary light, the supplementary light being consistent in color with light of one of the three primary colors; and
a control device configured to control on and off of the second light source, the control device controlling the second light source to be on in a second time period and at least one of a first time period or a third time period in such a manner that the supplementary light is incident on the wavelength conversion device after being combined with the first laser and finally emitted together with the second light emitted by the wavelength conversion device; the first time period being a time period during which a primary color light region of a same color is receiving the first laser, the second time period being a time period during which the mixed color light region is receiving the first laser, and the third time period being a part of a time period during which a primary color light region of a different color is receiving the first laser, the primary color light region of the same color being one of the three primary color light regions that emits light of a primary color same as that of the supplementary light, the primary color light region of the different color being one of the three primary color light regions that emits light of a primary color different from that of the supplementary light.

2. The light source system of claim 1, wherein the control device controls the second light source to be turned on at least in every time period during which the primary color light region of the same color is receiving the first laser and every time period during which the mixed color light region is receiving the first laser.

3. The light source system according to claim 1, further comprising a color correction film located in an optical path of the second light and configured to move synchronously with the wavelength conversion device, the color correction film comprising a plurality of color segments each corresponding to one of the regions of the wavelength conversion device and configured to receive the second light and transmit at least a portion of the second light.

4. The light source system according to claim 3, wherein when the control device controls the second light source to be turned on, one of the plurality of color segments of the color correction film that is located in the optical path of the second light allows the supplementary light to pass.

5. The light source system according to claim 1, wherein when the light source system is operating, the first light source is always on.

6. The light source system according to claim 1, wherein the first light source is a blue laser light source, the second light source is a red light source, the mixed color light region of the wavelength conversion device is a yellow light region, and the primary color light regions of the wavelength conversion device include a red light region.

7. The light source system according to claim 6, wherein the control device is configured to control the second light source to be on when the red light region and the yellow light region of the wavelength conversion device are receiving the first laser.

8. The light source system according to claim 1, further comprising a light combining unit located in an optical path between the first light source and the wavelength conversion device and configured to receive the first laser and the supplementary light, combine the first laser and the supplementary light and emit the combined first laser and the supplementary light to the wavelength conversion device.

9. The light source system according to claim 1, further comprising a light combining unit located in an optical path of light emitted by the wavelength conversion device and configured to receive the second light and the supplementary light, combine the second light and the supplementary light and emit the combined second light and the supplementary light.

10. A projection device, comprising a light source system, an optomechanical system and a display screen, wherein the optomechanical system is located at a light exit of the light source system and configured to receive emitted light and project it onto the display screen, the light source system comprising:
a first light source configured to emit first laser;
a wavelength conversion device located in an optical path of the first laser and configured to receive the first laser and emit second light, the wavelength conversion device at least comprising three primary color light regions and one mixed color light region;
a driver device configured to drive the wavelength conversion device to move in such a manner that respective regions of the wavelength conversion device sequentially and periodically receive the first laser, the three primary color light regions receiving the first laser and emitting light of three primary colors and each of the primary color light regions emitting light of one primary color, and the mixed color light region receiving the first laser and emitting light of a mixed color;
a second light source configured to emit supplementary light, the supplementary light being consistent in color with light of one of the three primary colors; and
a control device configured to control on and off of the second light source, the control device controlling the second light source to be on in a second time period and at least one of a first time period or a third time period in such a manner that the supplementary light is incident on the wavelength conversion device after being combined with the first laser and finally emitted together with the second light emitted by the wavelength conversion device; the first time period being a time period during which a primary color light region of a same color is receiving the first laser, the second time period being a time period during which the mixed color light region is receiving the first laser, and the third time period being a part of a time period during which a primary color light region of a different color is receiving the first laser, the primary color light region of the same color being one of the three primary color light regions that emits light of a primary color same as that of the supplementary light, the primary color light region of the different color being one of the three primary color light regions that emits light of a primary color different from that of the supplementary light.

11. The light source system of claim 1, wherein a spectrum of the light of the mixed color and a spectrum of the supplementary light at least partially overlap.

12. The light source system according to claim 1, wherein the supplementary light is of light of one of the three primary colors emitted by the wavelength conversion device having a lowest illuminous efficiency.

13. The light source system according to claim 3, wherein the color correction film and the wavelength conversion device are respectively fixed at two opposite ends of the driver device, and move synchronously based on the driver device.

14. The light source system according to claim 3, wherein the wavelength conversion device is a reflective color wheel, the color correction film is provided at a periphery of the color wheel, and the color correction film and the wavelength conversion device move synchronously based on the driver device.

15. The light source system according to claim 3, wherein the color correction film and the wavelength conversion device are stacked and fixed to the driver device, and move synchronously based on the driver device.

16. The light source system according to claim 6, wherein the primary color light regions further comprise a blue light region and a green light region, and when an area of the blue light region, an area of the green light region, an area of the red light region and an area of the yellow light region are identical, the area of the blue light region and the area of the green light region are increased, and the area of the red light region or the area of the yellow light region is decreased.

17. The light source system according to claim 6, wherein the primary color light regions further comprise a blue light region and a green light region; an area of the red light region and an area of the blue light region are identical, and a sum of the area of the red light region and the area of the blue light region is identical to a sum of an area of the green light region and an area of the yellow light region; and the area of the green light region is greater than the area of the yellow light region.

18. The projection device of claim 10, wherein the control device controls the second light source to be turned on at least in every time period during which the primary color light region of the same color is receiving the first laser and every time period during which the mixed color light region is receiving the first laser.

19. The projection device according to claim 10, further comprising a color correction film located in an optical path of the second light and configured to move synchronously with the wavelength conversion device, the color correction film comprising a plurality of color segments each corresponding to one of the regions of the wavelength conversion device and configured to receive the second light and transmit at least a portion of the second light.

20. The projection device according to claim 19, wherein when the control device controls the second light source to be turned on, one of the plurality of color segments of the color correction film that is located in the optical path of the second light allows the supplementary light to pass.

* * * * *